United States Patent
Schwindt et al.

(10) Patent No.: US 9,085,236 B2
(45) Date of Patent: Jul. 21, 2015

(54) ADAPTIVE CRUISE CONTROL WITH STATIONARY OBJECT RECOGNITION

(71) Applicant: Robert Bosch GmbH, Stuttgart (DE)

(72) Inventors: Oliver Schwindt, Novi, MI (US); Bhavana Chakraborty, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/065,539

(22) Filed: Oct. 29, 2013

(65) Prior Publication Data

US 2014/0336898 A1 Nov. 13, 2014

Related U.S. Application Data

(60) Provisional application No. 61/821,290, filed on May 9, 2013.

(51) Int. Cl.
*B60T 7/12* (2006.01)
*B60K 31/00* (2006.01)
*B60W 30/14* (2006.01)

(52) U.S. Cl.
CPC ............ *B60K 31/0008* (2013.01); *B60W 30/14* (2013.01); *B60W 2520/105* (2013.01); *B60W 2520/14* (2013.01); *B60W 2540/18* (2013.01); *B60W 2720/106* (2013.01); *Y02T 10/84* (2013.01)

(58) Field of Classification Search
None
See application file for complete search history.

(56) References Cited

U.S. PATENT DOCUMENTS

| | | | |
|---|---|---|---|
| 6,223,117 B1 * | 4/2001 | Labuhn et al. | 701/93 |
| 6,496,770 B2 | 12/2002 | Winner et al. | |
| 6,853,906 B1 * | 2/2005 | Michi et al. | 701/521 |
| 7,359,788 B2 | 4/2008 | Arai | |
| 7,512,475 B2 | 3/2009 | Perisho, Jr. et al. | |
| 7,831,367 B2 * | 11/2010 | Heinrichs-Bartscher | 701/96 |
| 8,010,274 B2 | 8/2011 | Sawada | |
| 8,155,856 B2 | 4/2012 | Sekiguchi | |
| 8,219,299 B2 | 7/2012 | Thiel | |
| 8,437,890 B2 * | 5/2013 | Anderson et al. | 701/3 |

(Continued)

FOREIGN PATENT DOCUMENTS

| | | |
|---|---|---|
| DE | 10330922 | 2/2005 |
| EP | 0924119 | 6/1999 |

(Continued)

OTHER PUBLICATIONS

International Search Report and Written Opinion for Application No. PCT/US2014/037066 dated Aug. 13, 2014 (11 pages).

*Primary Examiner* — Calvin Cheung
(74) *Attorney, Agent, or Firm* — Michael Best & Friedrich LLP

(57) ABSTRACT

An ACC system and object detection method for a vehicle. The ACC system includes a vehicle parameter sensor, an object detection sensor, and a controller. The controller is configured to calculate the vehicle's path based on a signal from the parameter sensor, detect an object based on the vehicle's path and a signal from the object detection sensor, determine an acceleration of the vehicle, and prevent the acceleration of the vehicle from increasing while the object is detected and the acceleration of the vehicle is greater than a predetermined acceleration threshold. The object detection method includes identifying stationary objects in a path of a vehicle and limiting an acceleration of the vehicle when the acceleration is above a threshold and a stationary object is identified.

16 Claims, 5 Drawing Sheets

(56) References Cited

U.S. PATENT DOCUMENTS

| | | | |
|---|---|---|---|
| 8,548,712 B2* | 10/2013 | Oesterreicher et al. | 701/99 |
| 8,798,841 B1* | 8/2014 | Nickolaou et al. | 701/23 |
| 2001/0027371 A1 | 10/2001 | Winner et al. | |
| 2001/0056320 A1* | 12/2001 | Kato et al. | 701/51 |
| 2003/0158648 A1* | 8/2003 | Kubota et al. | 701/96 |
| 2003/0171857 A1* | 9/2003 | Kuramochi et al. | 701/23 |
| 2005/0010351 A1* | 1/2005 | Wagner et al. | 701/96 |
| 2006/0047402 A1* | 3/2006 | Irion et al. | 701/93 |
| 2006/0065050 A1* | 3/2006 | Saito et al. | 73/511 |
| 2006/0155469 A1* | 7/2006 | Kawasaki | 701/301 |
| 2007/0198188 A1* | 8/2007 | Leineweber et al. | 701/300 |
| 2007/0233353 A1* | 10/2007 | Kade | 701/96 |
| 2007/0282530 A1* | 12/2007 | Meister et al. | 701/301 |
| 2009/0237226 A1* | 9/2009 | Okita | 340/435 |
| 2009/0248270 A1 | 10/2009 | Sekiguchi | |
| 2010/0052884 A1* | 3/2010 | Zeppelin et al. | 340/435 |
| 2010/0097200 A1* | 4/2010 | Hilsebecher et al. | 340/436 |
| 2011/0130932 A1* | 6/2011 | Takenaka et al. | 701/58 |
| 2011/0282558 A1* | 11/2011 | Park | 701/94 |
| 2012/0101701 A1* | 4/2012 | Moshchuk et al. | 701/70 |
| 2012/0277967 A1* | 11/2012 | Isaji et al. | 701/96 |
| 2013/0179025 A1* | 7/2013 | Deng et al. | 701/23 |
| 2013/0253750 A1* | 9/2013 | Otake | 701/22 |
| 2014/0343819 A1* | 11/2014 | Johansson et al. | 701/96 |

FOREIGN PATENT DOCUMENTS

| | | | |
|---|---|---|---|
| EP | 2405416 | 1/2012 | |
| WO | WO 01/11388 A1 * | 2/2001 | G01S 13/93 |

* cited by examiner

ADAPTIVE CRUISE CONTROL WITH STATIONARY OBJECT RECOGNITION

RELATED APPLICATIONS

The present application claims priority to U.S. Provisional Patent Application No. 61/821,290 filed May 9, 2013, the entire contents of which is incorporated by reference herein.

FIELD

Embodiments of the present invention relate to an adaptive cruise control (ACC), specifically to an ACC that reacts to stationary objects.

BACKGROUND

Prior art ACC systems do not accurately identify stationary objects, and are thus unable to react to stationary objects that the host vehicle encounters in the driving path, including parked cars. This is because radar sensors are commonly used in adaptive cruise control systems, which cannot accurately distinguish between vehicles and infrastructure such as poles, signs, or bridges. ACC systems that are unable to react to stationary objects within the host vehicle path also cannot detect objects such as stopped cars; i.e., in a traffic light scenario where the host vehicle switches into a lane already occupied by another vehicle waiting at the intersection. In this case, not only will the ACC system not react to the object, but the system might accelerate toward the object with a magnitude dependent on the speed the ACC system is trying to achieve, which could be high. The higher the acceleration commanded by the ACC system toward the stationary object, the more uncomfortable the effect can feel to the driver.

SUMMARY

Although video sensors can distinguish between vehicles and infrastructure better than radar sensors, they exhibit weaknesses in estimating longitudinal velocities and accelerations. Therefore, future implementations may include a combined video and radar sensor approach to stationary object detection. However, the added sensors for a combined video and radar approach require additional hardware, thus increasing the cost of the system. For this reason, ACC systems that do not react on stationary objects will remain common for some time.

In one embodiment, the invention provides a method for identifying stationary objects in a path of a vehicle and limiting an acceleration of the vehicle when the acceleration is above a threshold and a stationary object is identified.

In another embodiment, the invention provides an ACC system for a vehicle. The ACC system includes a vehicle parameter sensor, an object detection sensor, and a controller. The controller is configured to calculate the vehicle's path based on a signal from the parameter sensor, detect an object based on the vehicle's path and a signal from the object detection sensor, determine an acceleration of the vehicle, and prevent the acceleration of the vehicle from increasing while the object is detected and the acceleration of the vehicle is greater than a predetermined acceleration threshold.

Other aspects of the invention will become apparent by consideration of the detailed description and accompanying drawings.

DETAILED DESCRIPTION

Figure 1:
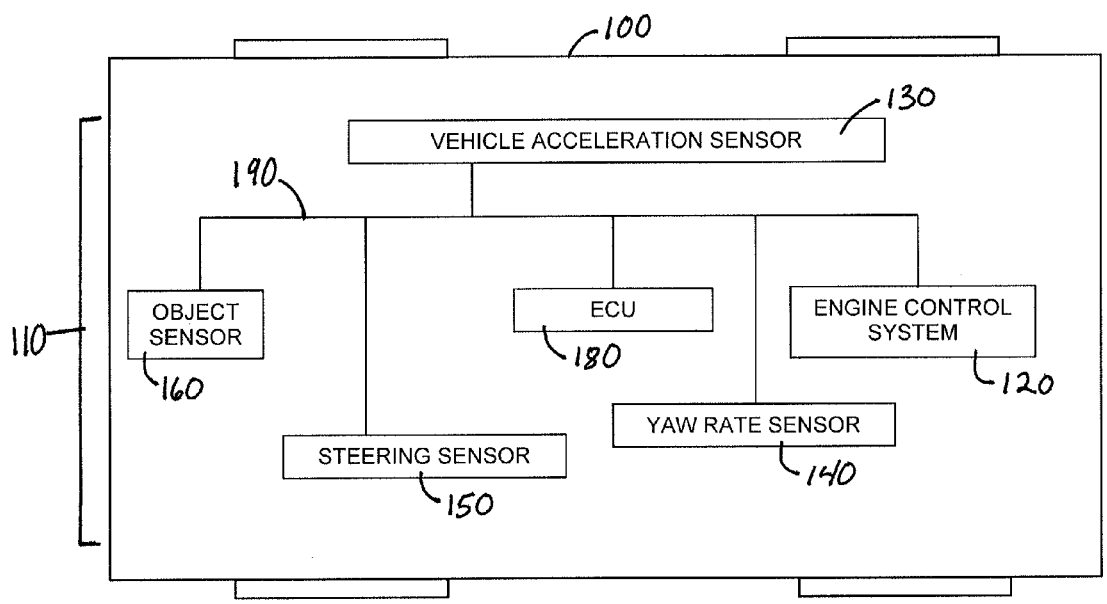
FIG. 1 schematically illustrates an ACC system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

The invention enables a partial reaction to stationary objects by an ACC using radar sensors that reduces the uncomfortable feeling of accelerating quickly toward stationary objects. The general idea is to detect stationary objects ahead of the vehicle, and then to limit acceleration without giving the driver the feeling that the ACC system is reacting on the stationary vehicle.

FIG. 1 illustrates a vehicle 100 having an ACC system 110. The vehicle 100 also has an engine control system 120. The Engine control system 120 may include known components or systems for adjusting the acceleration of the vehicle 100, such as a vehicle accelerator or an engine timing controller. The ACC system 110 has a vehicle acceleration sensor 130 for detecting the longitudinal acceleration of the vehicle 100, a yaw rate sensor 140 for detecting the rate at which the vehicle 100 is turning about its yaw axis, and a steering sensor 150 for detecting changes in steering direction of the vehicle 100. The ACC system 110 also has an object sensor 160 for detecting objects in the vicinity of the vehicle 100. The object sensor 160 may include any suitable object detecting sensors, such as a radar sensor or a video sensor. The object sensor 160 may also be used alone or in combination with other sensors. The ACC system 110 also includes a controller 180 (or electronic control unit, "ECU") that communicates electronically with sensors 130, 140, 150 and 160 over a communication bus 190.

The controller 180 is also in electronic communication with the engine control system 120 over the bus 190. It should be noted that bus 190 encompasses both wired and wireless forms of connection or data communication, and that one or more sensors can communicate with the controller 180 via a direct connection.

Figure 2:
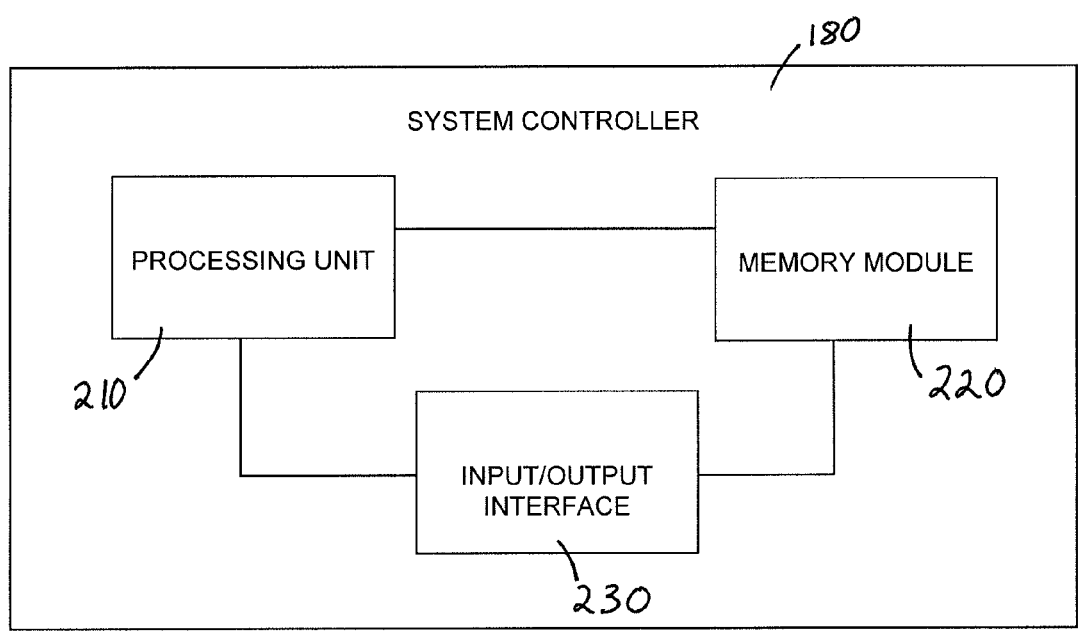
FIG. 2 schematically illustrates a controller included in the ACC system of FIG. 1.

The controller 180 may be a microprocessor-based controller such as a computer. FIG. 2 illustrates the controller 180. The controller 180 includes a processing unit 210 (e.g., a microprocessor, an application specific integrated circuit ("ASIC"), etc.), one or more memory modules 220, and an input/output interface 230. The memory modules 220 include non-transitory computer-readable media, such as random-access memory ("RAM") and/or read-only memory ("ROM"). The processing unit 210 can retrieve instructions from the memory modules 220 and execute the instructions to perform particular functionality. The processing unit 210 can also retrieve and store data to the memory modules as part of executing the instructions.

In addition, the processing unit 210 can obtain data from devices and systems external to the controller 180 through the input/output interface 230. For example, as noted above, the controller 180 is in electronic communication with the sensors 130, 140, 150, and 160, and receives signals from these sensors. The controller 180 also provides output to the engine control system 120. Therefore, the input/output interface 230 connects the controller 180 to the sensors 130, 140, 150, and 160, as well as to the engine control system 120, over the communication line 190, as mentioned above with regard to FIG. 1.

It should also be understood that the controller 180 can include additional components other than those described herein. Furthermore, in some embodiments, the functionality of the controller 180 can be distributed among multiple systems or devices. Also, in some embodiments, the functionality of the controller 180 can be combined with other systems or devices. For example, in some embodiments, the controller 180 may also perform in part the functionality of the engine control system 120.

Figure 3:
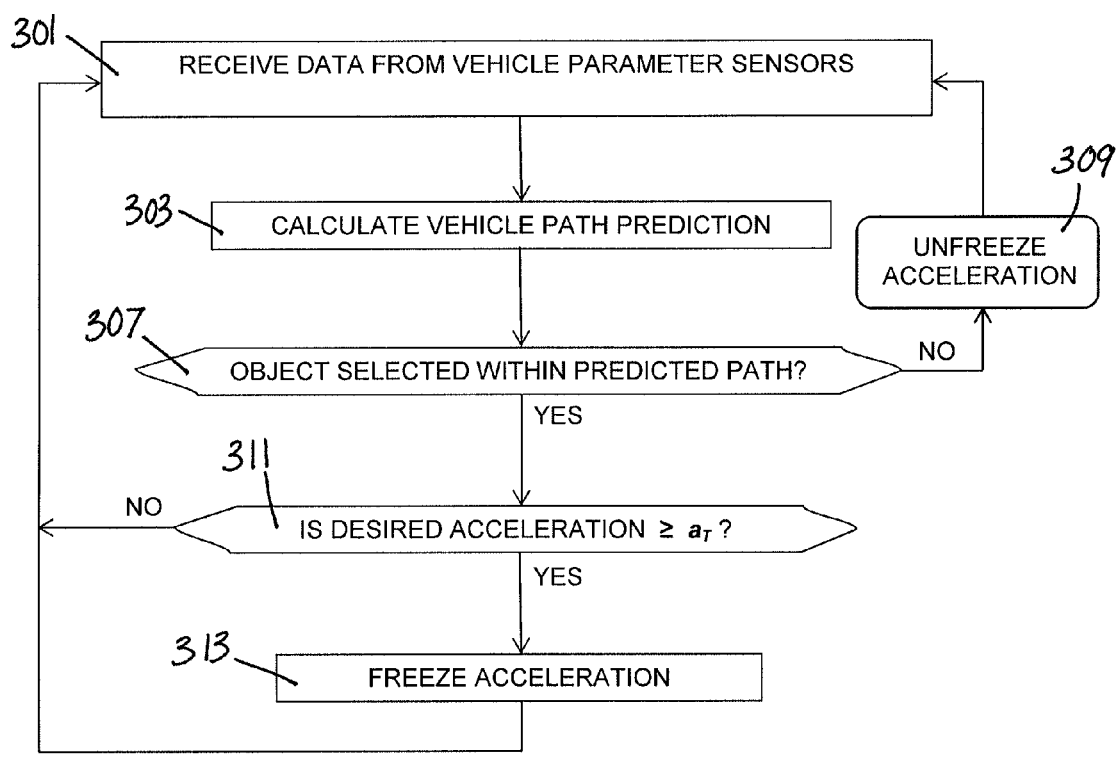
FIG. 3 is a flowchart illustrating control logic of the ACC system of FIG. 1.

Controller 180 contains logic that is executed by the processing unit 210. This logic, among other functions, limits vehicle acceleration based on detected stationary objects. For example, FIG. 3 shows the logic employed by the system 110 while the vehicle 100 is in cruise control mode. In ACC systems, cruise control mode makes it possible for a vehicle to follow a directly preceding vehicle (i.e., "object") at a certain distance or time gap without direct control from the driver to the vehicle controls (e.g., via the brake or acceleration pedals). In regions of light traffic or where no objects are present, the driver may use the ACC system such that speed regulation takes place at a desired, or "setpoint", speed. In order to maintain the desired speed as selected by the driver, the ACC system adjusts the vehicle acceleration whenever the vehicle drifts from the desired speed. The acceleration demanded by the ACC system to maintain the vehicle speed is herein referred to as the "desired acceleration", which is also the acceleration sensed by the acceleration sensor 130 while the system 110 is in cruise control mode.

At block 301 in FIG. 3, the controller 180 receives the vehicle's 100 driving parameters from the acceleration sensor 130, the yaw rate sensor 140, the steering sensor 150, and the object sensor 160; herein referred to collectively as "parameter sensors." The sensed driving parameters may include a longitudinal acceleration of the vehicle from the acceleration sensor 130, a vehicle yaw rate from the yaw rate sensor 140, a change in steering direction or steering angle from the steering sensor 150, and one or more detected object indications from the object sensor 160. At block 303, the controller 180 uses the sensed driving parameters, particularly the sensed vehicle yaw rate and the sensed steering direction, to calculate a predicted vehicle path. The predicted vehicle path has boundaries that are determined based on the sensed yaw rate of the vehicle 100 as well as the width of the vehicle 100. The predicted vehicle path encompasses an area ahead of the vehicle that is at least as wide as (or slightly wider than) the vehicle 100 itself, and is as far ahead of the vehicle 100 as a predetermined distance or range of distances (i.e., an established "look-ahead" distance). As described in further detail below, the predicted vehicle path boundaries are variable based on the sensed steering direction of the vehicle 100. In particular, the predicted path width is varied depending on the sensed yaw rate, a change in magnitude of steering direction, and/or a vehicle heading. The driving parameters received by the controller 180 may be stored to the memory module 220 to be accessed by the processor 210 as the logic of FIG. 3 is executed. For each predicted vehicle path calculation, the driving parameters in the memory module 220 are updated.

At block 307, the controller 180 uses the predicted vehicle path and the sensed object detection data to select objects to react to. An object is selected if it is both sensed by the object sensor 160 and determined to be present within the boundaries of the predicted vehicle path. If no objects are selected at block 307, the logic of the controller 180 proceeds to block 309, such that the system 110 unfreezes the vehicle's 100 acceleration if necessary (as will be described below in further detail), and the controller 180 proceeds to block 301. However, if an object is selected at block 307, the controller 180 proceeds to block 311.

At block 311, the sensed acceleration of vehicle 100 is compared to a predetermined acceleration threshold value ("$a_T$"). The value of $a_T$ is positive (e.g., approximately 0.5 m/s$^2$). This means that some acceleration can always be achieved, guaranteeing some acceleration even when an incorrect object is selected in the predicted path. If the desired acceleration is greater than or equal to $a_T$, the controller 180 proceeds to block 313, where the controller 180 signals the engine control system 120 to freeze the acceleration of the vehicle 100. Although freezing the acceleration prevents the acceleration from increasing any further, deceleration or braking by the ACC system is still permitted. After freezing the acceleration, the controller 180 returns to block 301 and repeats the object detection functionality described above. If an object is no longer selected within the predicted path at block 307, the controller 180 signals the engine control system 120 to unfreeze the acceleration at block 309, and the ACC system 110 resumes normal cruise control functions.

If the desired acceleration at block 311 is determined to be less than $a_T$, however, the controller 180 returns directly to block 301 to repeat the logic steps of blocks 301-311. In this case, since the acceleration is determined to be less than $a_T$, the system 110 does not freeze the acceleration. However, at block 307, if an object is still in the vehicle path, the controller 180 will permit increases in acceleration up to the value of $a_T$, but no further than $a_T$, until the object is no longer selected in the predicted vehicle path.

In blocks 301-311 of FIG. 3, the controller 180 repeatedly monitors the vehicle's 100 acceleration, yaw rate, steering direction, and predicted path based on information received by the controller 180. The logic of FIG. 3 will be used to describe the scenario of FIG. 4, below. However, the logic presented is not limited strictly to the exemplary scenarios discussed herein.

The logic presented in FIG. 3 can be widely implemented in a plurality of other hardware or software based devices, and therefore in a plurality of different scenarios, as well.

Figure 4:
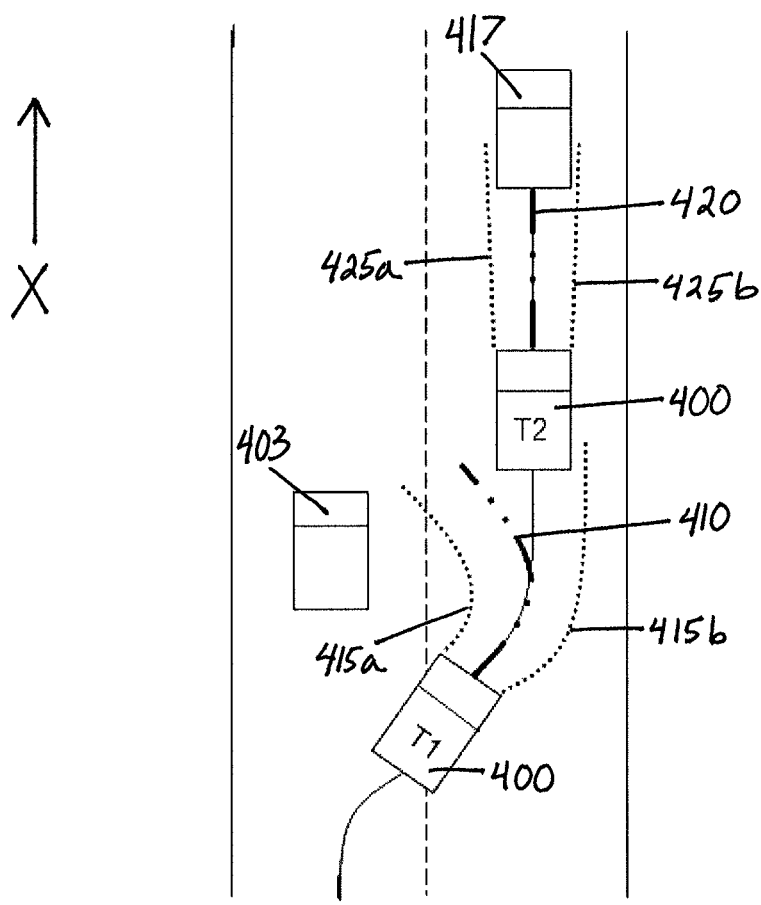
FIG. 4 diagrammatically illustrates a vehicle having the system of FIG. 1 in a lane change scenario.

FIG. 4 illustrates a vehicle 400 having the system 110 in an exemplary lane change scenario. The vehicle 400 is shown at different instances in time, T1 and T2, where T1 occurs prior in time to T2. Throughout instances T1 and T2, the vehicle 400 is shown traveling generally in the "X" direction as indicated. Also, prior to T1, cruise control is set to a desired speed based on input from the driver, after which the ACC system maintains the desired speed by adjusting the acceleration of the vehicle. While the vehicle 400 is in cruise control mode, the controller 180 is continuously monitoring the vehicle's 400 acceleration, yaw rate, steering direction, and predicted path based on information received by the controller 180. This means that while in cruise control mode, the vehicle 400 is continuously applying the logic of FIG. 3 via the controller 180.

At T1 in FIG. 4, the vehicle 400 is shown entering a lane change to avoid a moving vehicle 403. The system 110 for the vehicle 400 has a predicted vehicle path that is shown in FIG. 4 as being centered on a predicted trajectory 410 and bounded by the dotted lines 415a and 415b. As described above, the predicted vehicle path is calculated based on the vehicle's 400 sensed yaw rate and steering direction. The predicted trajectory 410 dictates the overall "shape" of the predicted vehicle path, depending on the yaw rate and steering direction of the vehicle 400. The boundaries 415a and 415b vary with the predicted trajectory 410, and define the width of the predicted vehicle path. As previously explained, the width of the predicted vehicle path (the area bounded between the lines 415a and 415b) is at least the width of the vehicle 400 itself or slightly wider, and is variable depending on the steering direction of the vehicle 400.

As previously mentioned, while the vehicle 400 is in cruise control mode, the controller 180 continuously applies the logic of FIG. 3. When the vehicle 400 initiates a lane change by steering toward the right lane, the change in steering direction is detected by the steering sensor 150 at block 301. The controller 180 then calculates the predicted path of the vehicle 400 at block 303, based on the sensed change in steering direction and the sensed yaw rate. This calculated vehicle path can be seen represented in FIG. 4 by the predicted trajectory 410 and the boundaries 415a and 415b.

In FIG. 4, the predicted trajectory 410 at time T1 is shown curving toward the left, since, based on the yaw rate of the vehicle 400, the controller 180 calculates (or anticipates) the vehicle 400 to turn back into the left lane. This is because the predicted trajectory 410 sways back and forth with a curvature based on the sensed yaw rate for the vehicle 400, until the sensed yaw rate indicates that the vehicle 400 has straightened out, at which point the predicted trajectory 410 becomes straight. The left boundary 415a of the predicted path has a curvature calculated in accordance with the curvature of the predicted trajectory 410. However, since the vehicle 400 is switching into the right lane and not turning back into the left lane as anticipated by the controller 180, the predicted vehicle path must be widened to also encompass objects present on the right lane (i.e., the lane that the vehicle 400 is switching into). In one embodiment, to widen the predicted path of the vehicle 400, the controller 180 calculates a lesser curvature for the right boundary 415b than for the left boundary 415a and the predicted trajectory 410. By applying a lesser curvature to the right boundary 415b, the predicted vehicle path is widened to encompass an area that includes the lane into which the vehicle 400 is turning. The widening of the predicted path can be triggered by the detected change in steering direction. A change in steering direction could mean, for example, that the steering wheel is sensed to be rotated away from the center (or "equilibrium") position that would otherwise maintain the vehicle on a straight-line path. The direction in which the vehicle is sensed to be steering indicates the side to which the predicted path is widened (i.e., will indicate which boundary will have a lesser calculated curvature).

The curvature of the boundary 415b could be calculated, for example, based on the vehicle heading or yaw rate in the last 3-4 seconds of the vehicle's 400 previously traveled course. This information is received by the controller 180 from the yaw rate sensor 140 in block 301 of FIG. 3, and then stored to the memory module 220 to be recalled by the processor in calculating the predicted path in block 303. This is provided that a change in steering direction is detected. The boundary that a lesser curvature should be calculated for should be the boundary on the side closest to the lane that the vehicle 400 is switching into. Thus, in the case of the vehicle 400, which is switching into the right lane, the lesser curvature is calculated for the right boundary 415b. In this way, for lane changes or similar cases such as turns, the predicted vehicle path can be widened to one side by the vehicle heading in the last 3-4 seconds of the vehicle's 400 previously traveled course. As described above, widening the course prediction is necessary because the yaw rate-based predicted trajectory 410 sways back and forth during a lane change (as seen for the predicted trajectory 410 and boundaries 415a and 415b at time T1 in FIG. 4). Particularly, prior to finally straightening the vehicle 400 out after a lane change, the predicted trajectory 410 is pointing away from the intended path of the vehicle 400. By calculating a widened predicted path, an object (e.g., a stationary vehicle) in the lane that the vehicle 400 is switching into can be selected earlier.

As previously described, the predicted vehicle path encompasses an area ahead of the vehicle that is at least as wide as (or slightly wider than) the vehicle 400 itself, and is as far ahead of the vehicle 400 as a predetermined distance or range of distances (i.e., an established "look-ahead" distance). Calculating the predicted path in block 303 thus includes calculating the look-ahead distance, or the distance ahead of the vehicle 400 up to which the boundaries 415a and 415b extend. Therefore, beyond the look-ahead distance, any objects detected by the object sensor 160 at block 301 will not be selected at block 307. This is because the objects detected are not considered to be present within the boundaries of the predicted path. In FIG. 4, for example, the look-ahead distance is visualized as extending as far as the dotted lines of 415a and 415b.

Defining the look-ahead distance to react to a stationary object sets the longitudinal boundaries of the predicted path. Any objects detected within the predicted path (i.e., within the area bounded by the boundaries 415a and 415b, as well as within the look-ahead distance) are selected by the controller 180 as objects to react on. In one embodiment, the look-ahead distance is not limited to being a fixed distance, but could also include a range of distances that are, for example, variable based on the vehicle's 400 speed. Many different criteria or combinations of criteria can be used to define the look-ahead distance. For example, a time to collision less than a threshold (e.g., approximately 4 seconds) could be used to identify a stationary object to react to. In addition, a minimum distance to the stationary object could be incorporated. Alternatively, the distance to be covered, assuming a given deceleration, can be used to identify the stationary object. And, a maximum distance can also be defined in order to avoid incorrect acquisitions at high speeds.

At time T1 in FIG. 4, no objects are selected for the vehicle 400 because no objects are detected by the object sensor 160 and selected within the predicted path. However, at time T2 in FIG. 4, the vehicle 400 is still in cruise control and has straightened out into the right lane. At this time, the vehicle 400 approaches a stationary vehicle 417 that is already present in the right lane. At this time, the system 110 for the vehicle 400 has executed logic blocks 301-303, which means that the controller 180 has received the vehicle's 400 driving parameters from the parameter sensors, calculated the predicted path, and projected the predicted path. Receiving the vehicle's 400 driving parameters from the parameter sensors at time T2 means that the controller 180 has received a signal from the object sensor 160 that the stationary vehicle 417 is present ahead of the vehicle 400. Also at time T2, the predicted trajectory 420 has straightened out, as have the path boundaries 425a and 425b. This is because the sensed yaw rate and steering direction at time T2 indicates that the vehicle 400 has straightened out. Thus, at time T2, no path widening is required, since no turns or lane changes have been detected. As the vehicle 400 at T2 approaches the stationary vehicle 417, the boundaries 425a and 425b "intercept" the stationary vehicle 417. In other words, the stationary vehicle 417 comes into view of the predicted path, and thus within the boundaries 425a and 425b for the vehicle 400. Thus, when the controller 180 executes block 307, the controller 180 selects the stationary vehicle 417 as an object to react on, which causes the logic of the controller 180 to proceed to block 311. This is because the stationary vehicle 417 is both detected by the object sensor 160, and is found within the boundaries 425a and 425b of the predicted path.

As previously described, at block 311, the controller 180 compares the sensed acceleration of the vehicle 400 to the predefined threshold value, $a_T$. At time T2, if the sensed acceleration (i.e., the acceleration desired by the system 110) is greater than or equal to $a_T$, and an object is selected (i.e., the stationary vehicle 417), the controller logic proceeds to block 313, and the controller 180 signals the engine control system 120 to freeze the vehicle 400's acceleration. This prevents the acceleration from increasing any further as the vehicle 400 approaches the stationary vehicle 417. Although deceleration or braking by the driver is allowed, the acceleration cannot be increased beyond the current value or $a_T$. This limitation of the acceleration will persist for the vehicle 400 until the stationary vehicle 417 is no longer selected in the predicted path. For example, the driver may initiate another lane change into the left lane to avoid the stationary vehicle 417.

However, at time T2, if the sensed acceleration of the vehicle 400 is determined to be less than $a_T$, then the system 110 permits acceleration up to the value of $a_T$, but no further, as described above with regard to FIG. 3. When the controller 180 executes blocks 301-307 and the stationary vehicle 417 is no longer selected in the predicted path, the control logic continues to block 309. At block 309, the system 110 unfreezes the acceleration. At this point, the system 110 can once again resume either the previously-desired acceleration, or a new acceleration as dictated by the driver. If the driver does not select a new acceleration (i.e., after decelerating or braking in response to the system's 110 reaction on the stationary vehicle 417), the engine control system 220 will allow the vehicle 400 to continue at the acceleration it had prior to the controller's 180 reaction on the vehicle 417.

Accordingly, the system 110 makes the reaction to the selected objects as smooth as possible. In particular, the system 110 does not give the feeling that it is reacting to the selected objects, whether the selected object is stationary or moving. In addition, by using a wide course prediction and large look-ahead distance, there is a high chance of selecting non-vehicle radar reflections off posts, bridges, manhole covers, etc. Furthermore, freezing the current desired acceleration at a maximum acceleration based on the predefined threshold value $a_T$, as described above, does not generate a jerk from reducing the acceleration. With the implementation of the methods described herein, the "worst case" feeling to the driver may be a lack of acceleration (i.e., in the event that an incorrect object is selected and reacted on). Since this worst case is very mild, a large number of incorrect detections are acceptable without distressing the driver.

Figure 5:
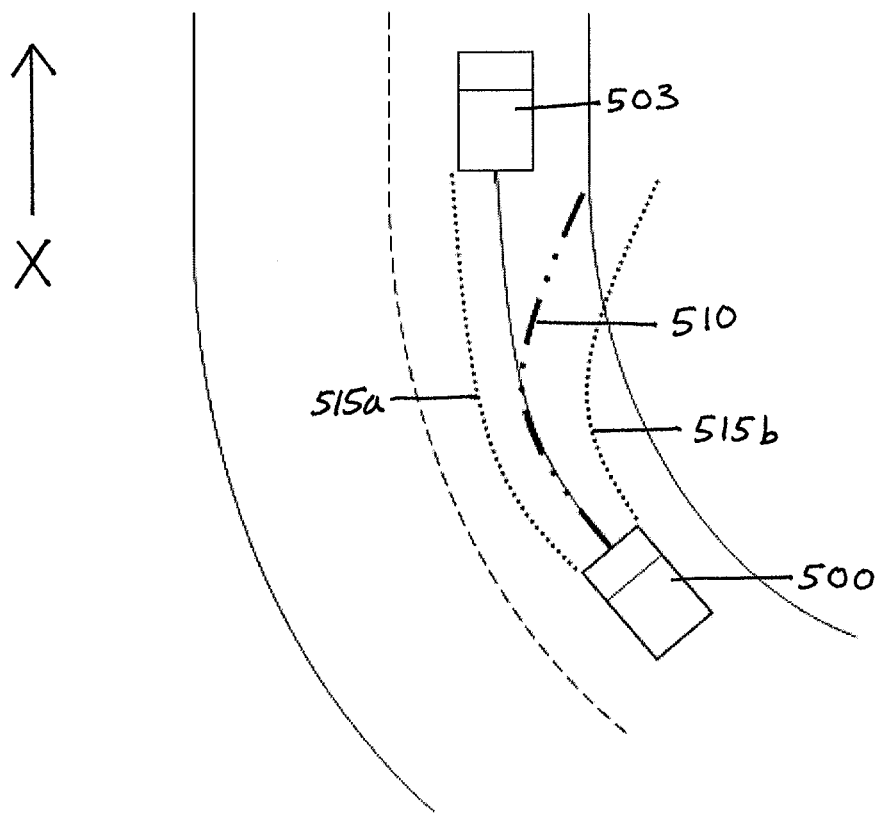
FIG. 5 diagrammatically illustrates a vehicle having the system of FIG. 1 in a turn or "curve in the road" scenario.

As previously mentioned, the logic presented in FIG. 3 can be widely implemented in a plurality of diverse scenarios, and is not limited to those scenarios discussed herein. For example, FIG. 5 diagrammatically illustrates a vehicle 500 having the system 110 in an exemplary turn or "curve in the road" scenario. As with the lane-change scenario diagrammed in FIG. 4 at time T2, the vehicle 500 is shown traveling generally in the "X" direction and is approaching a stationary vehicle 503, ahead. In the scenario of FIG. 5, the vehicle 500 enters a curve in the road, which may also be perceived as a turn, and is continuously applying the logic blocks of FIG. 3 while in cruise control mode.

At block 301, the controller 180 receives driving parameters for the vehicle 500 from the parameter sensors. Among the driving parameters received are the yaw rate from the yaw rate sensor 140 and the steering direction from the steering sensor 150. Because the vehicle 500 is entering a turn due to the curve in the road, a change in steering direction is detected at block 301. Thus, at block 303, the controller 180 calculates a widened predicted path as described for the lane change scenario at time T1 in FIG. 4. In calculating the predicted path, the controller 180 also incorporates the look-ahead distance, the possible methods for which are the same as those described with regard to FIG. 4. Similarly (with regard to the case illustrated in FIG. 4), the predicted trajectory 510 is calculated based on the current yaw rate of the vehicle 500, which causes the controller 180 to overestimate the turn. Overestimating the turn causes the predicted trajectory 510 to sway off the road and away from the intended vehicle path. Due to the detected change in steering direction, however, a widened predicted path is calculated and projected for the vehicle 500. The method for calculating the predicted path in the present turn scenario is the same as that used in the lane change scenario. Since the vehicle 500 is in a curve, it will eventually need to exit the curve, and the outer boundary of the course prediction is used to prepare for the vehicle 500 steering out of the curve (e.g., by using a lesser curvature or curvature change for that boundary).

In FIG. 5, the boundary 515a is shown to have a lesser curvature than 515b on the right, which approximately follows the curve of the predicted trajectory 510. In the case for turns, such as described for the vehicle 500, the boundary that a lesser curvature should be calculated for can be determined as the boundary that is on the outer side of the turn (i.e., the boundary on the side opposite the direction in which the vehicle is turning). For example, since the vehicle 500 is turning toward the right (i.e., clockwise), a lesser curvature is calculated and projected for the left-side boundary, 515a.

Among the parameters received by the controller 180 at block 301 is an indication from the object sensor 160 that the stationary vehicle 503 has been detected ahead. At block 307, the controller 180 determines whether or not to select the stationary vehicle 503 as an object to be reacted on. Because the stationary vehicle 503 has been detected by the object sensor 160 and is present within the predicted path boundaries 515a and 515b, the controller 180 selects the stationary vehicle 503, causing the control logic to proceed to block 311. The procedure for reacting on the stationary vehicle 503 is the same as for reacting on the stationary vehicle 417 in FIG. 4. At block 311, if the sensed acceleration is greater than or equal to $a_T$, the control logic proceeds to block 313 and freezes the acceleration until the stationary vehicle 513 is no longer selected. After the stationary vehicle 513 is no longer selected, the system 110 resumes normal ACC functions. If the acceleration is less than $a_T$, the value of $a_T$ is set as the maximum value that the acceleration can achieve until the stationary vehicle 503 is no longer selected.

Thus, embodiments of the invention relate to systems and methods for controlling an ACC system. Particularly, embodiments of the invention relate to methods for an ACC to identify objects in a path of a vehicle and limit an acceleration of the vehicle when the acceleration is above a threshold and an object is identified. Embodiments of the invention are not limited to the exemplary scenarios described herein, and are therefore applicable to a plurality of different scenarios and arrangements of hardware or software-based devices. It should also be noted that the thresholds, values, and parameters described are all subject to tuning Furthermore, different shapes for the predicted path, including the predicted trajectories and boundaries, may also be used. This method may also be applied to any vehicle, regardless of whether they are moving, driving in the same direction, or oncoming. This method may also be used in systems that generally react to stationary objects, or implemented as an initial partial reaction (i.e., limiting the acceleration without braking) prior to an additional full reaction taking place (i.e., a full brake administered by the ACC system).

Various features of the invention are set forth in the following claims.

What is claimed is:

1. A method for controlling a vehicle, the method comprising:
   using a controller to
      predict the vehicle's path;
      detect a stationary object within the predicted path based on a signal received from an object detection sensor;
      determine an acceleration of the vehicle is greater than a predetermined acceleration threshold; and,
      maintain the acceleration;
   wherein using a controller to predict the vehicle's path includes
      predicting a vehicle trajectory based on a vehicle yaw rate, and
      generating a path width based on the predicted vehicle trajectory and a width of the vehicle; and
   wherein generating a path width includes
      detecting a change in direction, and
      increasing the path width based on a magnitude of the change in direction.

2. The method according to claim 1, wherein the change in direction is detected by a steering direction sensor.

3. The method according to claim 1, wherein detecting a stationary object includes detecting objects within the predicted path that are within a pre-determined distance ahead of the vehicle.

4. The method according to claim 3, wherein the pre-determined distance is a pre-defined time-until-collision.

5. The method according to claim 3, wherein the pre-determined distance is based on a deceleration of the vehicle.

6. The method according to claim 3, wherein the pre-determined distance is a pre-defined maximum distance.

7. The method according to claim 1, further comprising, accelerating normally when the stationary object is no longer detected.

8. An adaptive cruise control (ACC) system for a vehicle, the ACC system comprising:
   a vehicle parameter sensor;
   a yaw rate sensor;
   a steering direction sensor;
   an object detection sensor; and,
   a controller configured to:
      calculate the vehicle's path based on a yaw rate and a steering direction;
      detect a stationary object based on the vehicle's path and a signal from the object detection sensor;
      determine an acceleration of the vehicle; and,
      when the acceleration of the vehicle is greater than a predetermined acceleration threshold, prevent the acceleration of the vehicle from increasing while the stationary object is detected;
   wherein the vehicle's path includes
      a vehicle trajectory based on the yaw rate, and
      a path width based on the vehicle trajectory and a width of the vehicle; and
   wherein the path width includes
      a detected change in direction, and
      an increase in the path width based on a magnitude of the change in direction.

9. The system of claim 8, wherein the object detection sensor includes a radar sensor.

10. The system of claim 8, wherein the object detection sensor includes a video camera configured to capture images ahead of the vehicle.

11. The system of claim 8, wherein the parameter sensor is at least one of a group consisting of a yaw rate sensor, an acceleration sensor, and a steering direction sensor.

12. The system of claim 8, wherein the change in direction is a change in the steering direction.

13. The system of claim 8, wherein the vehicle's path includes a pre-determined distance ahead of the vehicle.

14. The system of claim 13, wherein the pre-determined distance is a pre-defined time-until-collision.

15. The system of claim 13, wherein the pre-determined distance is based on a deceleration of the vehicle.

16. The system of claim 13, wherein the pre-determined distance is a pre-defined maximum distance.

* * * * *